(12) United States Patent
Nakamura

(10) Patent No.: US 8,821,664 B2
(45) Date of Patent: *Sep. 2, 2014

(54) METHOD OF FABRICATING PNEUMATIC TIRE

(75) Inventor: Norihiko Nakamura, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 1200 days.

This patent is subject to a terminal disclaimer.

(21) Appl. No.: 12/180,622

(22) Filed: Jul. 28, 2008

(65) Prior Publication Data

US 2009/0032173 A1 Feb. 5, 2009

(30) Foreign Application Priority Data

Aug. 1, 2007 (JP) ................................. 2007-201192

(51) Int. Cl.
*B29D 30/72* (2006.01)
*B60C 13/00* (2006.01)
*B29D 30/06* (2006.01)
*B29C 37/00* (2006.01)

(52) U.S. Cl.
CPC ............. *B60C 13/00* (2013.01); *B29C 37/0025* (2013.01); *B29D 2030/726* (2013.01); *B29D 30/0662* (2013.01); *B29C 37/0053* (2013.01)
USPC ........ 156/123; 152/524; 152/525; 156/130.7; 156/247

(58) Field of Classification Search
USPC ...................... 156/116, 123, 130.7, 247, 289; 152/524, 525
See application file for complete search history.

(56) References Cited

U.S. PATENT DOCUMENTS

| | | | |
|---|---|---|---|
| 3,285,314 A * | 11/1966 | Roberts | 152/524 |
| 3,761,338 A | 9/1973 | Ungar et al. | |
| 4,444,713 A | 4/1984 | Egan et al. | |
| 5,058,648 A | 10/1991 | Kansupada | |
| 5,527,407 A * | 6/1996 | Gartland et al. | 156/64 |
| 6,235,376 B1 * | 5/2001 | Miyazaki et al. | 428/203 |
| 8,006,732 B2 | 8/2011 | Itoi | |
| 2003/0230370 A1 * | 12/2003 | Stubbendieck et al. | 152/525 |
| 2004/0103967 A1 * | 6/2004 | Majumdar et al. | 152/450 |
| 2005/0087725 A1 | 4/2005 | Kanakkanatt | |

(Continued)

FOREIGN PATENT DOCUMENTS

| | | |
|---|---|---|
| EP | 1073031 | 1/2001 |
| JP | 63-203406 | 8/1988 |

(Continued)

OTHER PUBLICATIONS

C. A. Harper, ed., Modern Plastics Handbook, ch. 1 "Thermoplastics", 2000.*

(Continued)

*Primary Examiner* — Geoffrey L Knable
(74) *Attorney, Agent, or Firm* — Fish & Richardson P.C.

(57) ABSTRACT

A pneumatic tire provided with a resin film at an outer surface of the tire side portion to be able to be exfoliated therefrom by pasting a smooth resin film having a melting point equal to or higher than 23° C., a Young's modulus equal to or larger than 2.5 GPa and a thickness of 10 through 150 μm to an outer surface of a side portion of an unvulcanized tire and vulcanizing and molding the unvulcanized tire in a state of pasting the resin film.

9 Claims, 1 Drawing Sheet

(56) References Cited

U.S. PATENT DOCUMENTS

| | | |
|---|---|---|
| 2005/0109440 A1* | 5/2005 | Majumdar et al. ............ 152/524 |
| 2006/0083940 A1 | 4/2006 | Bekele |
| 2009/0032159 A1 | 2/2009 | Nakamura |
| 2009/0032172 A1* | 2/2009 | Nakamura ................. 156/110.1 |
| 2009/0032174 A1* | 2/2009 | Nakamura ................. 156/110.1 |

FOREIGN PATENT DOCUMENTS

| | | |
|---|---|---|
| JP | 63-302030 | 12/1988 |
| JP | 64-016407 | 1/1989 |
| JP | 03-292205 | 12/1991 |
| JP | 04-183768 | 6/1992 |
| JP | 06-106920 | 4/1994 |
| JP | 06-106921 | 4/1994 |
| JP | 06-258515 | 9/1994 |
| JP | 07-096719 | 4/1995 |
| JP | 10-143073 | 5/1998 |
| JP | 10-187044 | 7/1998 |
| JP | 3061600 | 6/1999 |
| JP | 11-286060 | 10/1999 |
| JP | 2000-142026 | 5/2000 |
| JP | 2002-241705 | 8/2002 |
| JP | 2004-017964 | 1/2004 |
| JP | 2006-143889 | 6/2006 |
| JP | 2006-264206 | 10/2006 |
| JP | 2007-136926 | 6/2007 |
| KR | 10-2005-0045220 | 5/2005 |

OTHER PUBLICATIONS

Archived web pages http://www.maropolymeronline.com/Properties/modulus_values.asp (archive date Jun. 16, 2002), http://www.maropolymeronline.com/Properties/nylon_66_properties.asp (archive date Jun. 16, 2002), http://www.maropolymeronline.com/Properties/Nylon%206.asp (archive date Dec. 25, 2002); all accessed from web.archive.org on Oct. 14, 2011.*
Notification of Reasons for Refusal for Japanese Application No. 2007-201193 dated Feb. 21, 2012 with English translation.
Notification of Reasons for Refusal for Japanese Application No. 2007-201191 dated Feb. 21, 2012 with English translation.
Notification of Reasons for Refusal for Japanese Application No. 2007-201192 dated Feb. 7, 2012 with English translation.
Office Action for U.S. Appl. No. 12/180,628 dated Mar. 31, 2011.
Office Action for U.S. Appl. No. 12/180,611 dated Mar. 22, 2011.
Office Action for U.S. Appl. No. 12/180,639 dated Jul. 12, 2011.
Final Office Action for U.S. Appl. No. 12/180,628 dated Jan. 20, 2012.
Final Office Action for U.S. Appl. No. 12/180,611 dated Dec. 22, 2011.
Palmer, R.J. and updated by staff 2005, Polyamides, Plastics, Kirk-Othmer Encyclopedia of Chemical Technology, Table 1, Jan. 27, 2005.
Machine translation of KR10-2005-0045220 date unknown.

* cited by examiner

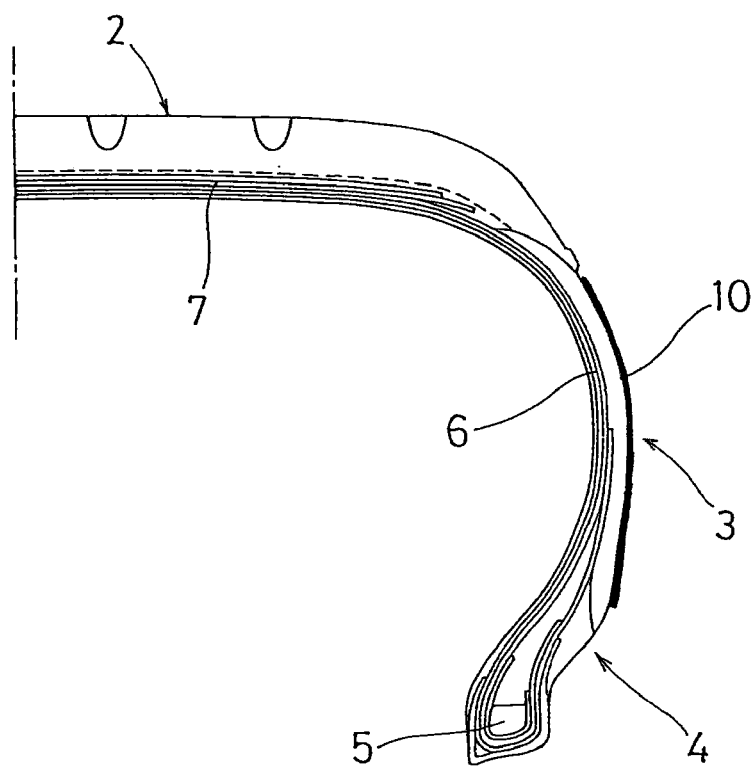

METHOD OF FABRICATING PNEUMATIC TIRE

CROSS-REFERENCE TO RELATED APPLICATIONS

This application is based upon and claims the benefit of priority from the prior Japanese Patent Application No. 2007-201192, filed on Aug. 1, 2007; the entire contents of which are incorporated herein by reference.

BACKGROUND

The present invention relates to a pneumatic tire, further in details, a pneumatic tire promoting an outlook by changing reflection of light at a tire outer surface.

Generally, it is important in view of promoting a commercial value of a pneumatic tire to promote an outlook of the pneumatic tire, particularly, an outlook of a side portion and various proposals have been made in a background art.

For example, JP-A-07-096719 (KOKAI)(reference 1) proposes a pneumatic tire provided with a nylon film layer on an outer side of a side wall rubber layer in order to promote an outlook of a tire as well as a weather resistance thereof. Further, JP-A-03-292205 (KOKAI) (reference 2) proposes a pneumatic tire laminating a thin film comprising polyethylene having an ultra high molecular weight on a side wall surface in order to promote an outlook while providing ozone crack resistance.

JP-A-2000-142026 (KOKAI)(reference 3) discloses that in order to promote a glossiness of a surface of a molded tire and promote an outlook of the tire, a surface of a mold is formed by shooting beads of a predetermined particle size and a tire surface a surface roughness (Ra) of which falls in a range of 1.5 through 20 µm is molded by using the mold. Further, US 2003/0230370 A1 (reference 4) discloses that in order to provide a light reflecting face along an outer surface of a tire, by using a mold having an average surface roughness less than 0.381 µm, a side wall portion of the tire is formed.

According to technologies disclosed in references 3 and 4 mentioned above, by rectifying a roughness of the mold surface, a glossiness of the tire side portion is promoted, however, the mold surface is adhered with a substance bloomed from inside of rubber constituting a tire main body in vulcanizing and molding the tire and is stained thereby. Therefore, there poses a problem that the stain is transcribed onto a surface of the side portion to deteriorate the outlook.

On the other hand, according to technologies disclosed in references 1 and 2 mentioned above, the resin film is provided at the outer surface of the tire side portion. However, the film is to be completely adhered to the tire main body, that is, the film constitutes a portion of the tire outer surface when the tire is used, thereby, a weather resistance or an ozone crack resistance is promoted. Therefore, for example, in reference 1, in order to firmly adhere the nylon film layer to the side wall rubber layer, the nylon film is subjected to a pretreatment of adherence of RFL (resorcinol formaldehyde latex) treatment or the like. Therefore, the technologies do not intend to provide the resin film at the tire outer surface to be able to be exfoliated therefrom.

Further, the nylon film and the polyethylene film disclosed in the references are provided with low melting points, and inferior in heat resistance in vulcanizing tire and there is a concern of shrinking the film. Therefore, when the films are assumedly exfoliated and the tires are subjected to use, the glossiness of the tire surface at which the film is exfoliated is deteriorated to pose a problem that an outlook is poor. Further, the films are not tenacious, and therefore, the films are difficult to be exfoliated to also pose a problem that the operability is inferior.

SUMMARY

The invention has been carried out in view of the above-described point and it is an object thereof to provide a pneumatic tire capable of promoting an outlook by promoting a glossiness of a tire side portion without deteriorating an operability.

According to the invention, there is provided a pneumatic tire, including pasting a smooth resin film having a melting point equal to or higher than 230° C., a Young's modulus equal to or larger than 2.5 GPa and a thickness of 10 through 150 µm to an outer surface of a side portion of an unvulcanized tire and vulcanizing and molding the unvulcanized tire in the state of pasting the resin film, whereby the resin film is provided at the outer surface of the tire side portion to be able to be exfoliated therefrom.

The resin film can be exfoliated from a tire main body after vulcanizing the tire and before the tire is used even when retarded, a surface roughness of a pasted portion is small, and therefore, a reflectance of light is promoted. Therefore, a glossiness is improved, a shining surface is provided to the tire side portion, and therefore, the outlook of the tire can be promoted. Further, when the resin film is exfoliated at a stage of delivering a commercial product to an end user, a defect or a stain in transporting the tire can also be prevented from being attached.

Further, by using the resin film having the predetermined property, the outlook can be promoted without deteriorating the operability in vulcanizing the tire and in exfoliating the resin film.

Further, when the resin film having the arithmetic average surface roughness (Ra) equal to or smaller than 0.1 µm is used, an excellent glossiness can be provided to the outer surface of the side portion by making a surface roughness of the tire after exfoliation very small.

BRIEF DESCRIPTION OF THE DRAWINGS

FIG. 1 is a half sectional view of a pneumatic tire according to an embodiment of the invention.

DETAILED DESCRIPTION

Articles related to an embodiment of the invention will be explained in details as follows.

A resin film used in the invention is a smooth film having a melting point equal to or higher than 230° C., a Young's modulus equal to or larger than 2.5 GPa and a thickness of 10 through 150 µm.

When the melting point of the film is lower than 230° C., the film is inferior in a heat resistance in vulcanizing a tire, and a glossiness of a tire surface from which the film is exfoliated is deteriorated by shrinking the film or the like. It is further preferable that the melting point of the film is equal to or higher than 250° C. Although an upper limit of the melting point of the film is not particularly limited, the higher the melting point, the better, normally, the upper limit is equal to or lower than 350° C. Here, the melting point is a value measured in conformity with DSC (differential scanning calorimeter) method of JIS K7121.

When the Young's modulus of the film is less than 2.5 GPa, the film is not tenacious when exfoliated, and therefore, the film is difficult to be exfoliated and operability is deteriorated.

It is further preferable that the Young's modulus of the film is equal to or larger than 3.5 GPa. Although an upper limit of the Young's modulus of the film is not particularly limited, it is preferable that the upper limit is equal to or smaller than 7 GPa. Here, the Young's modulus is a value measured at measuring temperature=23° C. in conformity with ASTM-D-882 and is an index indicating a tenacity and the larger the value the more tenacious.

As a resin film having such a melting point and Young's modulus, for example, a polyester resin film of a polyethylene terephthalate (PET) film, a polybutylene terephthalate (PBT) film, a polyethylene naphthalate (PEN) film or the like, or a fluorocarbon resin film or the like are pointed out.

When the thickness of the film is less than 10 μm, the film is easy to be wrinkled in pasting to an outer surface of an unvulcanized tire, the operability is deteriorated and the glossiness of the tire surface after exfoliating the film is deteriorated by the wrinkle. When the thickness of the film is thick to exceed 150 μm, a performance of following the rubber surface in vulcanizing and molding is poor, and the operability is inferior. The thickness of film is further preferably 20 through 120 μm. Here, the thickness of film is a value measured in conformity with JIS C2151.

It is preferable that an arithmetic average surface roughness (Ra) of the resin film is equal to or smaller than 0.1 μm. By using the resin film having Ra equal to or smaller than 0.1 μm, the glossiness of the tire surface after exfoliating the film can remarkably be promoted and can provide an excellent outlook shining in black color. Here, the arithmetic average surface roughness (Ra) is an arithmetic average roughness of a degree of recesses and projections of a surface per unit length measured in conformity with a standard of JIS B0601 (stylus type surface roughness measuring instrument) by using a stylus type surface roughness meter.

The resin film is provided at an outer surface of the tire side portion to be able to be exfoliated therefrom by pasting the resin film to an outer surface of an unvulcanized tire and vulcanizing and molding the unvulcanized tire under the state. In details, the resin film cut in a predetermined shape is pasted to a predetermined position of an outer surface of a side portion (that is, side wall portion) of a tire before being vulcanized (that is, green tire). Further, the unvulcanized tire is vulcanized and molded in a tire vulcanizing mold in a state of pasting the resin film. Thereby, a pneumatic tire provided with the resin film at the outer surface of the side portion to be able to be exfoliated therefrom is fabricated.

The resin film is provided with a smooth surface, and therefore, can maintain an excellent adherence with the surface of the unvulcanized tire having a viscosity and a positional shift of the resin film in being vulcanized can be prevented. When surface roughnesses of the resin film differ by two head and tail faces, the surface on a side of the arithmetic average surface roughness (Ra) equal to or smaller than 0.1 μm is pasted to the surface of the unvulcanized tire.

The resin film may be pasted to the unvulcanized tire before setting the unvulcanized tire to the vulcanizing mold, or/and, the resin film may be set to a predetermined position of the vulcanizing mold, and the resin film may be pasted to the unvulcanized tire by closing the mold at inside of the vulcanizing mold. Preferably, the resin film is pasted to the unvulcanized tire before being set to the vulcanizing mold as in the former.

Vulcanizing and molding per se of the unvulcanized tire can be carried out in accordance with a normal method and also a structure of the vulcanizing mold is not particularly limited. Although a vulcanizing temperature is not particularly limited, normally, vulcanizing is carried out at 160 through 200° C.

According to the pneumatic tire provided in this way, the resin film is provided at the outer surface of the side portion to be able to be exfoliated therefrom. That is, the resin film is pasted without interposing an adhering agent or the like between the resin film and the tire surface to be able to be exfoliated from a tire main body after having been vulcanized and molded.

Further, the smooth surface of the pasted resin film is transcribed to the outer surface of the tire substantially by the same surface roughness (Ra), and therefore, the tire surface after exfoliating the resin film is provided with an extremely smooth arithmetic average surface roughness (Ra) equal to or smaller than 0.1 μm similar to the resin film. Therefore, a high glossiness can be achieved by promoting a reflectance of light at the tire side portion and an excellent outlook shining in black color can be provided.

Although the resin film is subjected to use of the tire by being exfoliated, a timing of exfoliation is not particularly limited. That is, for example, the resin film may be exfoliated immediately after molding the tire, or may be exfoliated at a stage of providing the tire to an end user. Preferably, the resin film is exfoliated at a stage of providing to an end user, thereby, a defect or a stain in storage or transportation of the tire can be prevented from being attached.

FIG. 1 is a half sectional view of a pneumatic tire T1 according to the embodiment of the invention. The tire T1 is constituted by a tread portion 2, a pair of left and right side portions 3 extended from both ends of the tread portion 2 to an inner side in a tire radius direction, and a pair of left and right bead portions 4 continuous to inner ends of the side portions 3 and fixedly attached to a rim flange. According to the example, there is shown a radial tire for a passenger vehicle including a radial structure carcass 6 a carcass ply end of which is folded back to be locked thereto around the bead core 5 and a belt layer 7 arranged at an outer periphery of the tread portion 2 of the carcass 6.

The outer surface of the side portion 3 of the tire T1 is provided with the resin film 10 to be able to be exfoliated therefrom. The resin film 10 is provided in a ring-like shape over an entire periphery in a tire peripheral direction substantially in a total in a height direction of the side portion 3.

Further, the outer surface of the side portion 3 of the tire T1 is generally provided with a mark (not illustrated) constituted by character, numeral, sign indicating maker name, brand name, tire size or the like or a diagram of a tire rotating direction or the like.

By providing the resin film 10 over a wide range of a total of the side portion 3 in this way, an area of a rubber surface portion having a high glossiness after exfoliating the film is enlarged and an effect of promoting the outlook is excellent.

A portion of pasting the resin film is not particularly limited in a range or a size or a position so far as the portion is the tire side portion and may be provided at, for example, a portion in a tire peripheral direction of the side portion. Further, the resin film may be provided in a ring-like shape over an entire periphery in a tire peripheral direction in a comparatively narrow range in a height direction of the side portion. Further, the resin film cut along a contour of a mark may be pasted such that the mark is formed as a mirror face by pasting the resin film.

EXAMPLES

Although examples of the invention will be shown as follows, the invention is not limited to the examples.

As a rubber composition for a side wall, there was prepared a rubber composition by kneading by a normal method by using a Banbury mixer of a capacity of 200 L by a blending prescription constituted by natural rubber (RSS#3) 50 weight parts, butadiene rubber (made by UBE INDUSTRIES, LTD. 'UBEPOL-BR150B') 50 weight parts, carbon black FEF (made by Tokai Carbon Co., Ltd. 'SEAST SO') 60 weight parts, aroma oil (made by JAPAN ENERGY CORPORATION 'X-140') 10 weight parts, paraffin wax (made by NIPPON SEIRO CO., LTD. 'Ozoace-0355') 2 weight parts, anti-aging agent 6C (made by OUCHI SHINKO CHEMICAL INDUSTRIAL CO., LTD. 'NOCRAC 6C') 2 weight parts, stearic acid (made by KAO CORPORATION 'LUNAC S-20') 2 weight parts, zinc oxide (made by MITSUI MINNING & SMELTING CO., LTD. 'zinc white No. 1') 3 weight parts, sulfur (made by Hosoi Chemical Industry Co., Ltd. '5% oil treat powder sulfur') 2 weight parts, vulcanization promoter NS (made by OUCHI SHINKO CHEMICAL INDUSTRIAL CO., LTD. 'NOCCELER NS-P') 1.5 weight parts.

A pneumatic radial tire (size: 215/60R16) applying the provided rubber composition to a side portion was trially fabricated. At that occasion, in Examples 1 through 3 and Comparative Examples 2 through 6, a thermoplastic resin film described in Table 1 shown below was cut to a predetermined size, the film was pasted to an outer surface of a side portion of an unvulcanized tire as shown by FIG. 1, and set to a tire mold made of steel in a pasted state, and respective trial tires were vulcanized and molded under a vulcanizing condition of 170° C.×20 minutes.

Surface roughnesses of the respective films were measured by a method shown below. Further, with regard to the provided respective trial tires, an operability was evaluated and a glossiness of a rubber surface after exfoliating the resin film was measured. Respective measuring or evaluating methods were as follows.

[Surface Roughness]

An arithmetic average surface roughness (Ra) of a surface of a resin film is measured by using a stylus type surface roughness meter 'E-35A' made by TOKYO SEIMITSU CO., LTD. in conformity with a method of JIS B0601.

[Operability]

Occurrence of wrinkle in pasting the resin film, a finish result of a tire after having been vulcanized (particularly, portion of pasting the resin film), breakage in exfoliating the resin film, an easiness of exfoliation and the like are evaluated, and a case without problem is evaluated by 'o' and a case with problem is evaluated by 'x'.

[Glossiness]

60° glossiness of a rubber surface after exfoliating the resin film at the portion of pasting the resin film to the trial tire is measured in conformity with a method of JIS Z8741 by using a gloss meter 'VG2000' made by Nippon Denshoku Industries Co., Ltd. Measurement is carried out at 5 portions in a tire peripheral direction and an average value thereof is calculated. The larger the value the better the glossiness.

TABLE 1

| | | | resin film | | | | | |
|---|---|---|---|---|---|---|---|---|
| | kind | commercial name·maker | melting point (° C.) | Young's modulus (GPa) | thickness (μm) | surface roughness Ra (μm) | operability | glossiness |
| Example 1 | PET | Toray-made Lumirror S10 | 260 | 4 | 25 | 0.03 | o | 60 |
| Example 2 | PET | Toray-made Lumirror S10 | 260 | 4 | 100 | 0.03 | o | 64 |
| Example 3 | PEN | Teijin-made teonex Q51 | 260 | 6 | 25 | 0.03 | o | 62 |
| Comparative Example 1 | | | none | | | | o | 1.3 |
| Comparative Example 2 | nylon 6 | Toyo Boseki Harden N1100 | 220 | 2 | 25 | 0.03 | x | 20 |
| Comparative Example 3 | PET | Toray-made Lumirror S10 | 260 | 4 | 188 | 0.03 | x | 63 |
| Comparative Example 4 | PET | Toray-made Lumirror X44 | 260 | 4 | 50 | 0.2 | o | 16 |
| Comparative Example 5 | PET | Toray-made Lumirror X42 | 260 | 4 | 50 | 0.4 | o | 9.1 |
| Comparative Example 6 | PET | Kimoto-made carbon feather-X2B | 260 | 4 | 80 | 1.3 | o | 5.2 |

The result is as shown in Table 1, according to Examples 1 through 3, in contrast to Comparative Example 1 constituting a control tire which was not pasted with the resin film, a rubber surface having a very small surface roughness can be formed without deteriorating the operability, and therefore, a high glossiness was achieved and a side portion having an excellent outlook shining in black color can be formed.

In contrast thereto, according to Comparative Example 2 using the nylon film, the Young's modulus of the film was low, and therefore, the film was difficult to be exfoliated in separating from a tire and was poor in the operability. Further, the nylon film was provided with a low melting point, wrinkle was brought about in vulcanizing the tire and the glossiness was inferior.

Further, according to Comparative Example 3, the thickness of the resin film was excessively large, and therefore, the performance of following to the rubber surface was deteriorated, a problem was posed in the finish result after vulcanization and the operability was inferior. Although according to Comparative Examples 4 through 6, an effect of promoting glossiness to some degree was recognized without deteriorating the operability, the effect was insufficient, and when compared with the example using a film having the surface roughness Ra equal to or smaller than 0.1 μm, a clear difference was observed in the glossiness.

What is claimed is:

1. A method of fabricating a pneumatic tire, comprising pasting a smooth resin film having a melting point equal to or higher than 230° C., a Young's modulus equal to or larger than 2.5 GPa and a thickness of 10 through 150 μm to an outer surface of a side portion of an unvulcanized tire, the outer surface being black in color, and vulcanizing and molding the unvulcanized tire in the state of pasting the resin film, wherein the resin film has an arithmetic average surface roughness (Ra) equal to or smaller than 0.1 μm, is provided in a ring-like shape over an entire periphery in a tire peripheral direction in substantially a total in a height direction of the tire side portion and is provided directly, without interposition of an adhering agent, to the outer surface of the tire side portion to be able to be exfoliated therefrom, and further comprising exfoliating the resin film, and wherein the outer surface of the side portion of the tire after exfoliating the resin film has a 60° glossiness of 60-64.

2. The method of fabricating a pneumatic tire according to claim 1, wherein the resin film is a polyester resin film.

3. The method of fabricating a pneumatic tire according to claim 1, wherein the outer surface of the side portion of the tire after exfoliating the resin film has an arithmetic average surface roughness (Ra) equal to or smaller than 0.1 μm.

4. The method of fabricating a pneumatic tire according to claim 3, wherein the resin film has a Young's modulus equal to or larger than 3.5 GPa and a thickness of 20 to 120 μm.

5. The method of fabricating a pneumatic tire according to claim 1, wherein the resin film has a Young's modulus equal to or larger than 3.5 GPa and a thickness of 20 to 120 μm.

6. The method of fabricating a pneumatic tire according to claim 1, wherein the resin film is pasted to the outer surface of the side portion of the unvulcanized tire, and then the unvulcanized tire is set to a vulcanizing mold.

7. The method of fabricating a pneumatic tire according to claim 1, wherein the resin film is set to a predetermined position of a vulcanizing mold, and then the resin film is pasted to the unvulcanized tire at inside of the vulcanizing mold by closing the mold.

8. The method of fabricating a pneumatic tire according to claim 1, further comprising exfoliating the resin film at a stage of providing the tire to an end user.

9. A method of fabricating a pneumatic tire, comprising:
pasting a smooth resin film having a melting point equal to or higher than 230° C., a Young's modulus equal to or larger than 3.5 GPa and a thickness of 20 through 120 μm to an outer surface of a side portion of an unvulcanized tire, the outer surface being black in color, and setting the unvulcanized tire to a vulcanizing mold, and
vulcanizing and molding the unvulcanized tire in the state of pasting the resin film,
wherein the resin film has an arithmetic average surface roughness (Ra) equal to or smaller than 0.1 μm, is provided in a ring-like shape over an entire periphery in a tire peripheral direction in substantially a total in a height direction of the tire side portion and is provided directly, without interposition of an adhering agent, to the outer surface of the tire side portion to be able to be exfoliated therefrom, and
further comprising exfoliating the resin film, whereby the outer surface of the side portion of the tire after exfoliating the resin film has an arithmetic average surface roughness (Ra) equal to or smaller than 0.1 μm and has a 60° glossiness of 60-64.

\* \* \* \* \*